W. A. MILLIS.
TRANSMISSION GEARING.
APPLICATION FILED APR. 24, 1914.

1,141,813.

Patented June 1, 1915.
2 SHEETS—SHEET 1.

Witnesses

Inventor
W. A. Millis,
By Victor J. Evans
Attorney

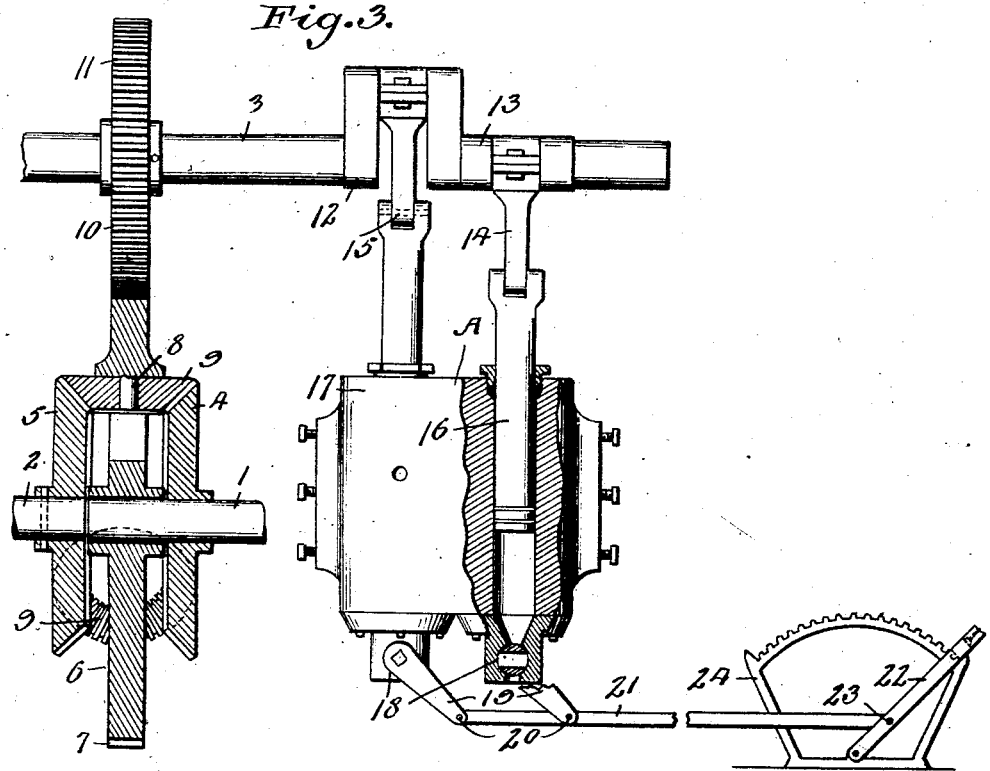
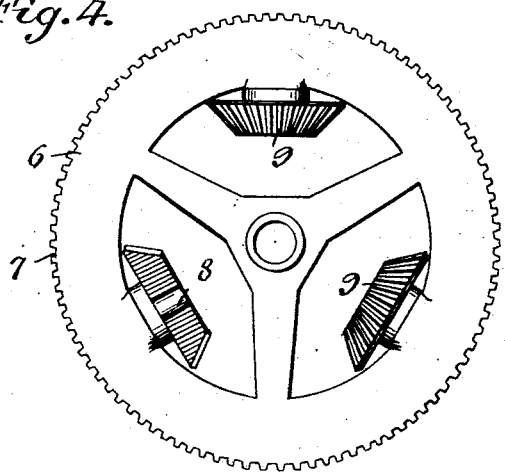
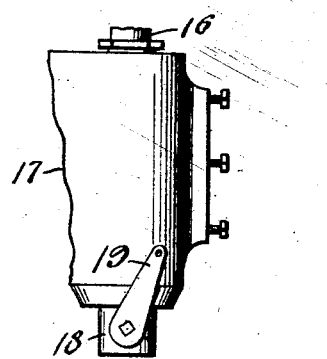

UNITED STATES PATENT OFFICE.

WILLIAM ALLAN MILLIS, OF WHEATLAND, CALIFORNIA.

TRANSMISSION-GEARING.

1,141,813.   Specification of Letters Patent.   Patented June 1, 1915.

Application filed April 24, 1914. Serial No. 834,173.

*To all whom it may concern:*

Be it known that I, WILLIAM ALLAN MILLIS, a citizen of the United States, residing at Wheatland, in the county of Yuba and State of California, have invented new and useful Improvements in Transmission-Gearing, of which the following is a specification.

This invention relates to transmission gearing, the object in view being to produce simple and reliable mechanism under the control of the operator whereby motion may be transmitted from a driving element to a driven element under variable relative speeds of said elements, the arrangement being such that the driven element may be allowed to remain still or at rest while the driving element continues in constant operation, the arrangement also providing for the gradual taking up and propulsion of the driven element under any speed varying from nothing to the full speed of the driving element.

A further object of the invention is to provide variable speed transmission gearing particularly applicable to motor vehicles of all kinds for transmitting motion from the engine shaft to the rear wheel driving mechanism of the vehicle.

With the above and other objects in view, the invention consists in the novel construction, combination and arrangement of parts, as will be hereinafter more fully described, illustrated and claimed.

Figure 1:
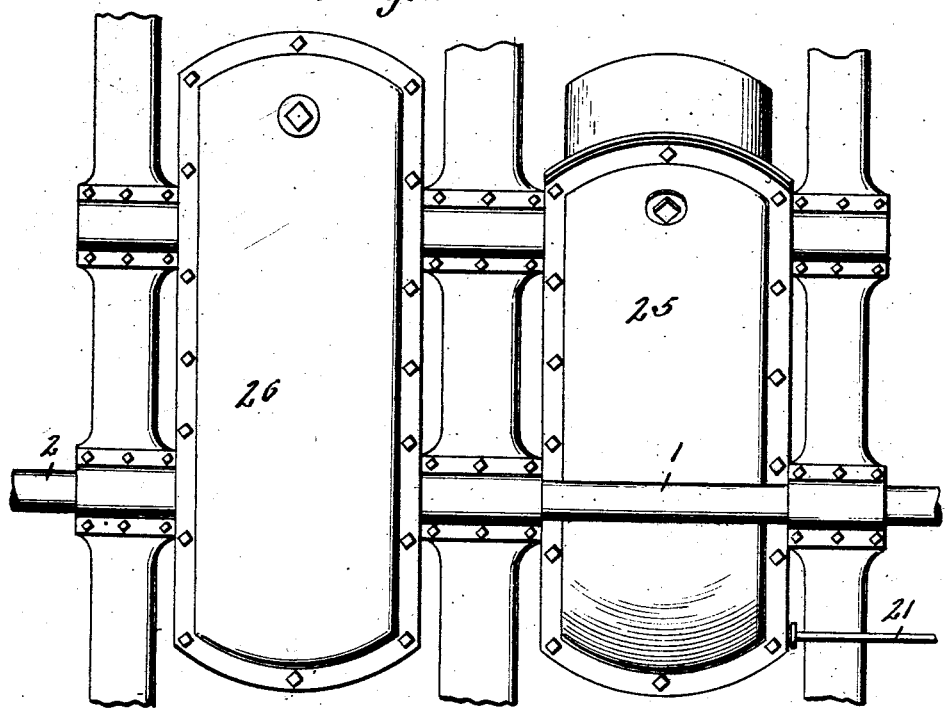
Figure 2:
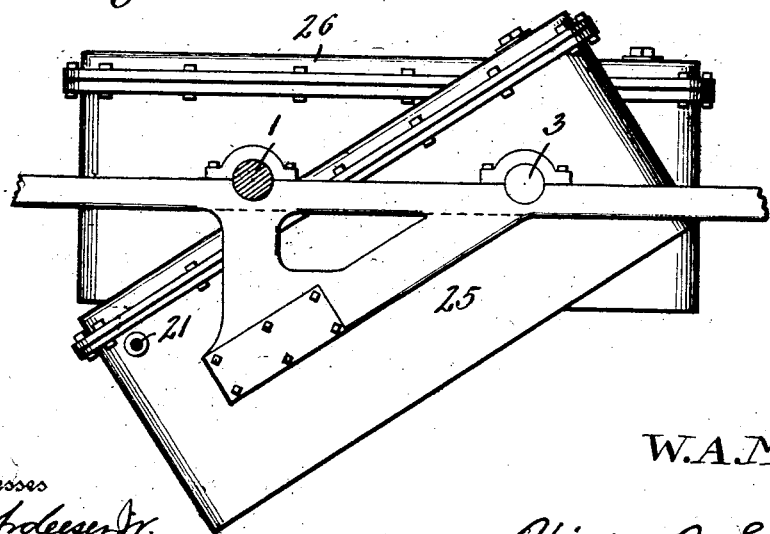

In the accompanying drawings:—Figure 1 is a plan view showing the driving shaft, the driven shaft, the retarding shaft and the frame and casings by which said shafts are supported and in which the operating mechanism is housed. Fig. 2 is an end elevation of the same. Fig. 3 is a longitudinal section through the mechanism omitting the frame work and housings for the working parts. Fig. 4 is a face view of the pinion carrier wheel, showing the pinions carried thereby. Fig. 5 is a detail view of the speed regulator, showing a different position of the valve operating lever.

Referring to the drawings and particularly Fig. 3 thereof, 1 designates the driving shaft or element, 2 the driven shaft or element, 3 the retarding shaft and A generally designates the speed regulator. Fast on the driving shaft 1 is a driving gear 4 shown in the form of a bevel gear while fast on the driven shaft 2 is a driven gear 5, also in the form of a bevel gear, it being noted that the shafts 1 and 2 are in longitudinal alinement with each other but free to revolve independently of each other. Mounted loosely on the shaft 1 between the gears 4 and 5 is a pinion carrier wheel 6 provided on its outer periphery with a spur gear face 7. The wheel 6 is provided with any desired number of journals 8 extending radially with respect to the center of the wheel and having loosely mounted thereon bevel pinions 9 which mesh with both of the wheels 4 and 5 above referred to. The pinion carrier wheel 6 meshes with a retarding gear wheel 10 having a spur gear working face 11 and mounted fast on the retarding shaft 3 above referred to. This retarding shaft 3 is in the form of a crank shaft, being provided with cranks 12 and 13 shown as set about 90° apart and having attached thereto connecting rods 14 which have a jointed connection at 15 with a corresponding number of retarding pistons or plungers 16 forming part of the speed regulator A. The speed regulator also comprises a like number of cylinders 17 shown as cast in a block, each of the cylinders being controlled by an oscillatory valve 18 connected to the stem of which is a lever arm 19. The lever arms 19 are pivotally connected at 20 to a common operating bar 21 which is thrust back and forth by means of a thumb latch lever 22 pivotally connected to the bar 21 at 23 and held in any adjusted position by means of a toothed rack 24, the lever 22 and the rack 24 being placed at any convenient point of operation.

The speed regulator above described is contained in a housing 25 which is preferably liquid-tight so that it may be filled with liquid, preferably oil, to be operated upon by the pistons or plungers 16 of the speed regulator. The gearing referred to and comprising the gears 4, 5, 6, 9 and 10 is inclosed in a housing 26, said housing being best illustrated in Figs. 1 and 2 and in the latter figure, the housing 25 being shown as extending at an angle to the housing 26 in order that the driving shaft 4 may pass to one side of the said housing 25. It will of course be apparent, however, that the entire mechanism including all of the gearing and the speed regulator may be contained in a single housing. The housing 26 may also be filled with oil or grease so that all of the gears will run in lubricating material.

In Fig. 3 the valve levers 19 are shown as extending away from the cylinders 17 of the speed regulator but they may be extended in the opposite direction as indicated in Fig. 5 for the sake of compactness if so desired.

In operation, when the valves 18 are closed, the pistons or plungers 16 are held stationary due to the resistance of the air, oil or other liquid contained in said cylinders, it being of course impossible, when said valves are closed, for the air or liquid to escape from the cylinders 17. Under such a condition, the retarding shaft 3 is held stationary as also the gear 10 and the pinion carrier wheel 6. Therefore, the driving wheel 4 causes the pinions 9 to revolve and to transmit motion to the driven shaft 2 which is thereby driven at the same speed as the driving shaft 1. By partially opening the valves 18, the air or liquid is adapted to be pumped from the cylinders 7 at a speed proportionate to the size of the openings afforded by the valve 18. Consequently this permits the retarding shaft 3 to revolve at a certain speed and the pinions 9 are therefore permitted to travel around the axes of the shafts 1 and 2, the carrier 6 being, however, retarded sufficiently to cause the pinions 9 to drive the driven gear 5 at a proportionate speed. The more the valves 18 are opened, the faster the pinion carrier is permitted to revolve and when the valves 18 are fully opened, there is no resistance to the movements of the pistons or plungers 16 and therefore there is no retarding effect on the pinion carrier 6. This allows the pinion carrier to freely revolve and the pinions 9 then merely run around the toothed face of the driven gear 5 without imparting any driving movement to the shaft 2.

In the operation of a motor vehicle, the engine is started with the valves 18 open. The operator then gradually moves the lever 22 so as to slowly move the valves 18 toward their closed positions. Thus the retarding effect on the pinion carrier 6 is gradually increased until finally the pinion carrier 6 is brought to a stop. In this way the speed of the engine shaft is transmitted to the driving shaft at a gradual and progressive increase of speed until the full speed of the engine shaft is imparted to the driving shaft of the vehicle.

The vehicle speed transmission gearing hereinabove described is applicable to all kinds of motors such as internal combustion engines, electric motors and the like. The mechanism acts as a clutch, as well as speed varying mechanism and it will also be apparent that the gearing as a whole is also applicable to hoists or elevators operated by any motive power. The speed regulating device may operate either with air, oil or other liquid in the cylinders thereof and it will of course be understood that the pistons and cylinders may be varied in size and stroke in accordance with the use to which the device as a whole is to be put.

What I claim is:—

1. Transmission gearing comprising a drive shaft and a driven shaft, driving and driven gears respectively fast on said shafts, a pinion carrier wheel, planetary pinions carried thereby and meshing with said driving and driven gears, a retarding wheel geared to the pinion carrier wheel, and means for retarding said last named wheel including a liquid pump, a liquid tight casing inclosing said pump and containing liquid, and valve mechanism for controlling and varying the supply of liquid to said pump.

2. Transmission gearing comprising a drive shaft and a driven shaft, driving and driven gears respectively fast on said shafts, a pinion carrier wheel, planetary pinions carried thereby and meshing with said driving and driven gears, teeth on the periphery of said pinion carrier wheel in a common plane with the axes of said pinions, a retarding wheel meshing with the teeth of the pinion carrier wheel, means for retarding said last named wheel including a liquid pump, a liquid tight casing inclosing said pump and containing liquid, and valve mechanism for controlling and varying the supply of liquid to said pump.

In testimony whereof I affix my signature in presence of two witnesses.

WILLIAM ALLAN MILLIS.

Witnesses:
ARTHUR KING DAM,
ARTHUR CHESTER STINEMAN.